US011658301B2

(12) United States Patent
Shin et al.

(10) Patent No.: US 11,658,301 B2
(45) Date of Patent: May 23, 2023

(54) LITHIUM SECONDARY BATTERY AND METHOD OF PREPARING THE SAME

(71) Applicant: LG CHEM, LTD., Seoul (KR)

(72) Inventors: Won Kyung Shin, Daejeon (KR); Kyoung Ho Ahn, Daejeon (KR); Chul Haeng Lee, Daejeon (KR); Jae Won Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 81 days.

(21) Appl. No.: 16/770,931

(22) PCT Filed: Apr. 1, 2019

(86) PCT No.: PCT/KR2019/003818
§ 371 (c)(1),
(2) Date: Jun. 8, 2020

(87) PCT Pub. No.: WO2019/198961
PCT Pub. Date: Oct. 17, 2019

(65) Prior Publication Data
US 2021/0167392 A1    Jun. 3, 2021

(30) Foreign Application Priority Data

Apr. 10, 2018  (KR) .................. 10-2018-0041812

(51) Int. Cl.
| *H01M 50/449* | (2021.01) |
| *H01M 4/62* | (2006.01) |
| *H01M 10/0525* | (2010.01) |
| *H01M 10/058* | (2010.01) |
| *H01M 50/443* | (2021.01) |
| *H01M 4/02* | (2006.01) |

(52) U.S. Cl.
CPC ......... *H01M 4/623* (2013.01); *H01M 10/058* (2013.01); *H01M 10/0525* (2013.01); *H01M 50/443* (2021.01); *H01M 50/449* (2021.01); *H01M 2004/027* (2013.01); *H01M 2004/028* (2013.01); *H01M 2300/0028* (2013.01); *H01M 2300/0085* (2013.01)

(58) Field of Classification Search
CPC .............. H01M 4/623; H01M 50/449; H01M 10/0525; H01M 10/058; H01M 2004/027; H01M 2004/028; H01M 2300/0028; H01M 2300/0085
See application file for complete search history.

(56) References Cited

U.S. PATENT DOCUMENTS

| 6,841,303 B2 | 1/2005 | Park et al. | |
| 2002/0015893 A1* | 2/2002 | Noh | H01M 10/0565 |
| | | | 29/623.1 |
| 2002/0136958 A1 | 9/2002 | Park et al. | |
| 2002/0136959 A1 | 9/2002 | Park et al. | |
| 2002/0142207 A1 | 10/2002 | Watakabe et al. | |
| 2008/0014490 A1 | 1/2008 | Watakabe et al. | |
| 2009/0246635 A1 | 10/2009 | Takano et al. | |
| 2011/0305971 A1 | 12/2011 | Watakabe et al. | |
| 2011/0318630 A1* | 12/2011 | Wakizaka | H01M 10/052 |
| | | | 429/144 |
| 2012/0301813 A1 | 11/2012 | Watakabe et al. | |
| 2015/0072244 A1* | 3/2015 | Chen | H01M 4/622 |
| | | | 429/303 |
| 2017/0309956 A1 | 10/2017 | Park | |
| 2018/0019457 A1 | 1/2018 | Alharizah et al. | |

FOREIGN PATENT DOCUMENTS

| CN | 105914405 | * | 8/2016 |
| CN | 105914405 | A | 8/2016 |
| CN | 105958122 | A | 9/2016 |
| CN | 107710469 | A | 2/2018 |
| JP | 2001-357883 | A | 12/2001 |
| JP | 2002-158037 | A | 5/2002 |
| JP | 2009-070605 | A | 4/2009 |
| JP | 5680241 | B2 | 3/2015 |
| JP | 2017-530533 | A | 10/2017 |
| JP | 2018-509493 | A | 4/2018 |
| KR | 10-2006-0042326 | * | 5/2006 |
| KR | 10-2006-0042326 | A | 5/2006 |
| KR | 10-2008-0003793 | A | 1/2008 |
| KR | 10-0858795 | B1 | 9/2008 |
| KR | 10-2015-0131513 | A | 11/2015 |
| KR | 10-2016-0069386 | * | 6/2016 |
| KR | 10-2016-0069386 | A | 6/2016 |
| KR | 10-1683202 | B1 | 12/2016 |

(Continued)

OTHER PUBLICATIONS 10-2016-0069386 MT (Year: 2016).*
KR 10-2006-0042326 MT (Year: 2006).*
CN105914405MT (Year: 2016).*
Decision to grant a Patent issued by JPO for Application No. 2020-529741 (Year: 2022).*
Decision to grant a Patent issued by KPO for Application No. 10-2018-0041812 (Year: 2022).*
CN107710469A MT (Year: 2018).*

(Continued)

*Primary Examiner* — Alexander Usyatinsky

(74) *Attorney, Agent, or Firm* — Morgan, Lewis & Bockius LLP

(57) ABSTRACT

The present invention relates to a lithium secondary battery including a positive electrode, a negative electrode, a separator, which includes a coating layer including an organic binder and inorganic particles, and a gel polymer electrolyte formed by polymerization of an oligomer, wherein the organic binder and the gel polymer electrolyte are bonded by an epoxy ring-opening reaction, and a method of preparing the same.

17 Claims, No Drawings

(56) References Cited

FOREIGN PATENT DOCUMENTS

KR   10-2017-0108063 A   9/2017
WO   2010/074202 A1   7/2010

OTHER PUBLICATIONS

International Search Report (with partial translation) and Written Opinion issued in corresponding International Patent Application No. PCT/KR2019/003818, dated Jul. 15, 2019.
Extended European Search Report dated Mar. 9, 2021 issued by the European Patent Office in a corresponding European patent application No. 19786000.0.
Lee et al., "A review of recent developments in membrane separators for rechargeable lithium-ion batteries," Energy & Environmental Science, vol. 7, No. 12, 2014, pp. 3857-3886, XP055779893.

* cited by examiner

LITHIUM SECONDARY BATTERY AND METHOD OF PREPARING THE SAME

CROSS-REFERENCE TO RELATED APPLICATIONS

This application claims the benefit of Korean Patent Application No. 10-2018-0041812, filed on Apr. 10, 2018, in the Korean Intellectual Property Office, the disclosure of which is incorporated herein in its entirety by reference.

TECHNICAL FIELD

Technical Field

The present invention relates to a lithium secondary battery and a method of preparing the same, and more particularly, to a lithium secondary battery including a gel polymer electrolyte and a method of preparing the same.

Background Art

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Also, recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted.

Nickel-metal hydride (Ni-MH) secondary batteries or lithium secondary batteries having high energy density, high discharge voltage, and output stability have been used as power sources of the electric vehicles (EVs) and hybrid electric vehicles (HEVs), wherein, in a case in which the lithium secondary batteries are used in the electric vehicles, since the lithium secondary batteries must be used for more than 10 years under harsh conditions in addition to high energy density and ability to provide high output in a short period of time, energy density, safety, and long-term life characteristics, which are significant better than those of a conventional small-sized lithium secondary battery, are inevitably required.

In general, a lithium secondary battery is prepared by using a negative electrode, a positive electrode, a separator disposed between them, and an electrolyte as a transfer medium of lithium ions, wherein an electrolyte in a liquid state, particularly, an ionic conductive organic liquid electrolyte, in which a salt is dissolved in a non-aqueous organic solvent, has been mainly used in a conventional secondary battery.

However, in a case in which the electrolyte in a liquid state is used, the possibilities of degrading an electrode material and volatizing the organic solvent are not only high, but also there is a problem in safety, for example, combustion caused by increases in ambient temperature and temperature of the battery itself. In particular, the lithium secondary battery has limitations in that, since gas is generated in the battery due to the decomposition of a carbonate organic solvent and/or a side reaction between the organic solvent and an electrode during charge and discharge, a thickness of the battery increases. Thus, degradation of performance and safety of the battery essentially occurs.

In general, it is known that battery safety improves in the order of a liquid electrolyte, a gel polymer electrolyte, and a solid polymer electrolyte, but battery performance decreases in the same order. Currently, it is known that the solid polymer electrolyte has not been commercialized yet due to poor battery performance.

The separator used in the lithium secondary battery is an inert material that does not participate in an electrochemical reaction, but a material which provides a path through which lithium ions move to operate the battery and separates physical contact between the positive electrode and the negative electrode, wherein it is one of the key materials that greatly affect performance and stability of the battery.

With respect to the lithium secondary battery, heat may be easily generated due to kinetic energy generated during repeated charge and discharge, wherein the separator is vulnerable to this heat. Particularly, with respect to a separator using polyethylene (PE), a 'shut down' phenomenon may occur in which melting starts at about 130° C. to close pores, and if the separator melts completely above 150° C. so that it may not prevent an internal short circuit and a thermal runaway phenomenon occurs, the lithium secondary battery may be collapsed (meltdown or mechanical integrity failure).

In order to address this limitation, studies for enhancing durability, for example, the use of a dip coating method in which inorganic particles and a polymer binder are coated on a surface of the separator, have recently been continued.

In addition to the above-described limitation, in a case in which a separator having a coating layer including a gel polymer electrolyte and inorganic particles formed thereon is used together, since adhesion between the coating layer and the electrolyte is low, there is a limitation in that the stability and performance of the secondary battery are degraded.

Therefore, there is a need to develop a secondary battery which may improve safety and capacity characteristics of the battery by using a separator having excellent adhesion to the gel polymer electrolyte as well as excellent durability.

(Patent Document 1) Korean Patent Application Laid-open Publication No. 10-2015-0131513

DISCLOSURE OF THE INVENTION

Technical Problem

An aspect of the present invention provides a lithium secondary battery which may improve capacity characteristics and safety of the battery by increasing adhesion between a gel polymer electrolyte and a separator.

Technical Solution

According to an aspect of the present invention, there is provided a lithium secondary battery including a positive electrode; a negative electrode; a separator which includes a coating layer including an organic binder and inorganic particles; and a gel polymer electrolyte formed by polymerization of an oligomer, wherein the organic binder and the gel polymer electrolyte are bonded by an epoxy ring-opening reaction.

The organic binder may include an epoxy group, a functional group capable of undergoing a ring-opening reaction with the epoxy group, or a combination thereof.

The oligomer may include an epoxy group, a functional group capable of undergoing a ring-opening reaction with the epoxy group, or a combination thereof.

The functional group capable of undergoing a ring-opening reaction with the epoxy group may include at least one functional group selected from the group consisting of a hydroxyl group (OH), a carboxylic acid group (COOH), an amine group, an isocyanate group, a mercaptan group, and an imide group.

The organic binder may include a unit containing at least one selected from the group consisting of an alkylene group having 1 to 5 carbon atoms which is substituted with at least one halogen element, an alkylene oxide group having 1 to 5 carbon atoms, an alkylene oxide group having 1 to 5 carbon atoms which is substituted with at least one halogen element, an imide group, and celluloid, wherein an epoxy group, a functional group capable of undergoing a ring-opening reaction with the epoxy group, or a combination thereof may be substituted into a main chain composed of the unit.

The oligomer may include at least one unit selected from the group consisting of a unit containing an alkylene oxide group and a unit containing an amine group, wherein an epoxy group, a functional group capable of undergoing a ring-opening reaction with the epoxy group, or a combination thereof may be substituted into a main chain composed of the unit.

According to another aspect of the present invention, there is provided a method of preparing a lithium secondary battery which includes: inserting an electrode assembly composed of a positive electrode, a negative electrode, and a separator, which includes a coating layer including inorganic particles and an organic binder that includes an epoxy group, a functional group capable of undergoing a ring-opening reaction with the epoxy group, or a combination thereof, into a battery case; and performing thermal polymerization after injecting a composition for a gel polymer electrolyte, which includes an oligomer including the epoxy group, the functional group capable of undergoing a ring-opening reaction with the epoxy group, or the combination thereof, into the battery case.

The composition for a gel polymer electrolyte may not include an initiator.

The composition for a gel polymer electrolyte may be composed of a lithium salt, a non-aqueous organic solvent, and the oligomer including the epoxy group, the functional group capable of undergoing a ring-opening reaction with the epoxy group, or the combination thereof.

Advantageous Effects

In a lithium secondary battery according to the present invention, since a gel polymer electrolyte and an organic binder in a separator coating layer are bonded by an epoxy ring-opening reaction, adhesion between the gel polymer electrolyte and the separator is excellent.

When the adhesion between the gel polymer electrolyte and the separator is improved, since an increase in interfacial resistance between the electrolyte and the separator may be suppressed, capacity characteristics may be improved and mechanical safety and high-temperature safety may also be improved.

MODE FOR CARRYING OUT THE INVENTION

Hereinafter, the present invention will be described in detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Unless otherwise specified in the present invention, the expression "*" denotes the same or different atom or a portion connected between ends of a formula.

In the present invention, the expression "weight-average molecular weight" may denote a standard polystyrene-equivalent value measured by gel permeation chromatography (GPC), and, unless otherwise specified, a molecular weight may denote the weight-average molecular weight. For example, in the present invention, GPC conditions are as follows: the weight-average molecular weight is measured by using 1200 series by Agilent Technologies, a PL mixed B column by Agilent Technologies may be used in this case, and tetrahydrofuran (THF) may be used as a solvent.

<Lithium Secondary Battery>

A lithium secondary battery according to the present invention includes a positive electrode, a negative electrode, a separator, which includes a coating layer including an organic binder and inorganic particles, and a gel polymer electrolyte formed by polymerization of an oligomer. In this case, the organic binder and the gel polymer electrolyte are bonded by an epoxy ring-opening reaction.

First, the separator will be described.

The separator includes a base material and a coating layer formed on a surface of the based material, wherein the coating layer includes an organic binder and inorganic particles.

A porous based material may be used as the base material, and, typically, any porous base material may be used without particular limitation as long as it may be used as a separator material of an electrochemical device. The porous based material, for example, includes a nonwoven fabric or porous polymer film formed of at least one selected from polymer resins, such as polyolefin, polyethylene terephthalate, polybutylene terephthalate, polyacetal, polyamide, polycarbonate, polyimide, polyether ether ketone, polyether sulfone, polyphenylene oxide, polyphenylene sulfide, and polyethylene naphthalene, or a laminate of two or more thereof, but the porous base material is not particularly limited thereto.

The coating layer is to improve adhesion between the separator and the gel polymer electrolyte and enhance durability of the battery by coating the inorganic particles on the base material, wherein the coating layer is formed on the surface of the based material and includes an organic binder and inorganic particles.

In this case, the coating layer may have a thickness of 0.1 µm to 20 µm, preferably 0.5 µm to 20 µm, and more preferably 1.0 µm to 20 µm. In a case in which the thickness of the coating layer is formed within the above range, durability of the separator and the adhesion to the electrolyte may be maintained at a predetermined level or more, an increase in resistance of the battery may be prevented, and movement of lithium ions may be smoothly maintained.

Typically, in order to improve the durability and conductivity of the separator, inorganic particles on the surface of the base material have been used and a binder has been used to prevent detachment of the inorganic particles. However, since the conventional binder does not have a functional group capable of undergoing a bonding reaction with a gel polymer electrolyte, adhesion between the electrolyte and the separator is low, and thus, internal resistance between the electrode and the electrolyte is high and there is a safety problem such as the occurrence of an internal short circuit of the battery if an impact is applied to the outside of the battery.

In the present invention, in order to solve the above-described problem, a coating layer is formed using an organic binder which may be bonded with the gel polymer electrolyte by an epoxy ring-opening reaction.

In order for the epoxy ring-opening reaction to occur, the organic binder includes an epoxy group, a functional group capable of undergoing a ring-opening reaction with the epoxy group, or a combination thereof, and the oligomer also includes an epoxy group, a functional group capable of undergoing a ring-opening reaction with the epoxy group, or a combination thereof. However, in a case in which only the epoxy group exists in both the organic binder and the oligomer or in a case in which only the functional group capable of undergoing a ring-opening reaction with the epoxy group is included, since the epoxy ring-opening reaction may not be performed, the oligomer must include the functional group capable of undergoing a ring-opening reaction with the epoxy group in the case that only the epoxy group exists in the organic binder. In contrast, in the case that only the functional group capable of undergoing a ring-opening reaction with the epoxy group exists in the organic binder, the oligomer must include the epoxy group.

When the separator and the gel polymer electrolyte are bonded by the epoxy ring-opening reaction, since the gel polymer electrolyte is uniformly adhered to a separator interface, interfacial resistance may be reduced and transfer characteristic of lithium ions may be improved to improve capacity characteristics of the battery.

Also, when the adhesion between the separator and the gel polymer electrolyte is improved, since mechanical strength of the secondary battery may be improved to prevent a short-circuit phenomenon of the battery even when an external impact is applied and to suppress a thermal runaway phenomenon or ignition phenomenon, safety of the battery may be improved.

The functional group capable of undergoing a ring-opening reaction with the epoxy group may include at least one functional group selected from the group consisting of a hydroxyl group (OH), a carboxylic acid group (COOH), an amine group, an isocyanate group, a mercaptan group, and an imide group.

Specifically, the amine group may be represented by —$NR_1R_2$, wherein $R_1$ and $R_2$ may each independently be at least one selected from the group consisting of hydrogen (H), a substituted or unsubstituted chain alkyl group having 1 to 10 carbon atoms, and a substituted or unsubstituted cyclic alkyl group having 1 to 10 carbon atoms.

More specifically, the imide group may be represented by —$R_3$—CO—N ($R_4$)—CO—$R_5$, wherein $R_3$ to $R_5$ may each independently be at least one selected from the group consisting of hydrogen (H), a substituted or unsubstituted chain alkyl group having 1 to 10 carbon atoms, and a substituted or unsubstituted cyclic alkyl group having 1 to 10 carbon atoms.

Common organic binders well known in the art, for example, binders, in which an epoxy group and/or a functional group capable of undergoing a ring-opening reaction with the epoxy group is substituted into poly(vinylidene fluoride) (PVdF) or PVdF-co-HFP (copolymer of poly(vinylidene fluoride) and hexafluoropropylene), may be used as the organic binder. Specifically, the organic binder may further include a unit containing at least one selected from the group consisting of an alkylene group having 1 to 5 carbon atoms which is substituted with at least one halogen element (fluorine (F), chlorine (Cl), bromine (Br), and iodine (I)), an alkylene oxide group having 1 to 5 carbon atoms, an imide group, and celluloid, in addition to the above functional group.

In this case, the epoxy group, the functional group capable of undergoing a ring-opening reaction with the epoxy group, or a combination thereof may be substituted into a main chain composed of the above unit. Specifically, hydrogen (H) in the main chain may be substituted with the epoxy group, the functional group capable of undergoing a ring-opening reaction with the epoxy group, or the combination thereof, and a degree of substitution may be calculated in mol %. However, the number or position of the attached functional groups is not specified.

For example, the unit containing the alkylene group substituted with at least one halogen element may be represented by at least one selected from units represented by Formulae X-1 and X-2 below.

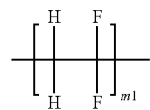

[Formula X-1]

In Formula X-1, m1 is an integer of 1 to 10,000, preferably 1 to 7,500, and more preferably 1 to 5,000.

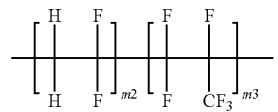

[Formula X-2]

In Formula X-2, m2 and m3 are each independently an integer of 1 to 10,000, preferably 1 to 7,500, and more preferably 1 to 5,000.

For example, the unit containing the alkylene oxide group may be represented by Formula X-3 below.

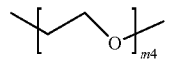

[Formula X-3]

In Formula X-3, m4 is an integer of 1 to 10,000, preferably 1 to 7,500, and more preferably 1 to 5,000.

For example, the unit containing the alkylene oxide group substituted with a halogen element may be represented by Formula X-4 below.

[Formula X-4]

In Formula X-4, m5 is an integer of 1 to 10,000, preferably 1 to 7,500, and more preferably 1 to 5,000.

For example, the unit containing the imide group may be represented by Formula X-5 below.

[Formula X-5]

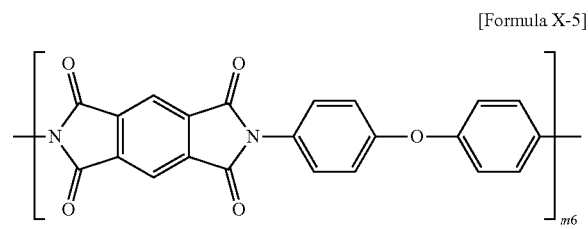

In Formula X-5, m6 is an integer of 1 to 10,000, preferably 1 to 7,500, and more preferably 1 to 5,000.

For example, the unit containing the celluloid may be represented by Formula X-6 below.

[Formula X-6]

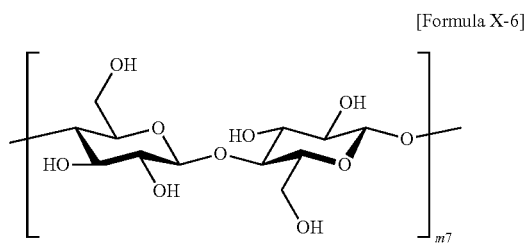

In Formula X-6, m7 is an integer of 1 to 10,000, preferably 1 to 7,500, and more preferably 1 to 5,000.

The organic binder may be included in an amount of 1 part by weight to 80 parts by weight, preferably 5 parts by weight to 60 parts by weight, and more preferably 5 parts by weight to 40 parts by weight based on 100 parts by weight of the coating layer. In a case in which the organic binder is included in an amount within the above range, the detachment of the inorganic particles included in the coating layer may be prevented, and adhesion to the oligomer constituting the gel polymer electrolyte may also be maintained at a predetermined level or more.

The inorganic particles form a space (interstitial volume) between the particles to form micropores and also serve as a kind of spacer capable of maintaining a physical shape at the same time. Also, since the inorganic particles may transmit and transfer lithium ions, lithium ion conductivity may be improved. In this case, micropores may be formed by controlling a size of the inorganic particles and an amount of the inorganic particles, and a pore size and porosity may be controlled.

The inorganic particles may include inorganic particles commonly used in the art. For example, the inorganic particles may include at least one element selected from the group consisting of silicon (Si), aluminum (Al), titanium (Ti), zirconium (Zr), tin (Sn), cerium (Ce), magnesium (Mg), calcium (Ca), zinc (Zn), yttrium (Y), lead (Pb), barium (Ba), hafnium (Hf), and strontium (Sr), and may preferably include at least one element selected from the group consisting of Si, Al, Ti, and Zr.

Specifically, the inorganic particles may include $SiO_2$, $Al_2O_3$, $TiO_2$, $ZrO_2$, $SnO_2$, $CeO_2$, MgO, CaO, ZnO, $Y_2O_3$, $Pb(Zr,Ti)O_3$ (PZT), $Pb_{(1-a1)}La_{a1}Zr_{(1-b1)}Ti_{b1}O_3$ (PLZT, where, $0 \le a1 \le 1$ and $0 \le b1 \le 1$), $PB(Mg_3Nb_{2/3})O_3$—$PbTiO_3$ (PMN-PT), $BaTiO_3$, $HfO_2$ (hafnia), and $SrTiO_3$, and the inorganic materials listed above generally have a property that their physical properties do not change even at a high temperature of 200° C. or higher. More preferably, the inorganic particles may include at least one inorganic material selected from the group consisting of $SiO_2$, $Al_2O_3$, $TiO_2$, and $ZrO_2$.

The inorganic particles may be included in an amount of 20 parts by weight to 99 parts by weight, preferably 40 parts by weight to 95 parts by weight, and more preferably 60 parts by weight to 95 parts by weight based on 100 parts by weight of the coating layer. In a case in which the inorganic particles are included in an amount within the above range, the durability of the separator for a secondary battery may be improved while the detachment of the inorganic particles from the coating layer may be prevented.

Next, the gel polymer electrolyte will be described.

The gel polymer electrolyte may be disposed between the positive electrode, the negative electrode, and the separator, and is formed by polymerization of an oligomer.

Specifically, the oligomer includes an epoxy group, a functional group capable of undergoing a ring-opening reaction with the epoxy group, or a combination thereof. In a case in which the oligomer is used, the oligomer may be thermally polymerized by an epoxy ring-opening reaction between the oligomers and may also be bonded to the organic binder included in the separator coating layer by an epoxy ring-opening reaction.

With respect to an oligomer polymerized by conventional radical polymerization, the oligomers may be bonded by a polymerization reaction only when a polymerization initiator is essentially used. However, azo-based and peroxide-based compounds used as a radical polymerization initiator have a limitation in that the compounds reduce the safety of the battery by generating gas in the battery during a curing reaction.

The oligomer used in the gel polymer electrolyte of the present invention is an oligomer polymerized by an epoxy ring-opening reaction, wherein the polymerization reaction may be performed without using a polymerization initiator which is used when a conventional oligomer is polymerized. Thus, since gas is not generated in the battery even during curing through the polymerization reaction, swelling of the battery and an electrode short-circuit phenomenon induced by the swelling may be prevented in advance to improve the safety of the battery.

Specifically, the oligomer includes at least one unit selected from the group consisting of a unit containing an alkylene oxide group and a unit containing an amine group, wherein the epoxy group, the functional group capable of undergoing a ring-opening reaction with the epoxy group, or the combination thereof may be substituted into a main chain composed of the above unit.

For example, the oligomer may include at least one compound selected from the group consisting of compounds represented by Formula 2 and Formula 3 below.

[Formula 2]

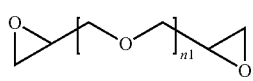

n1 may be an integer of 2 to 10,000, preferably 2 to 7,500, and more preferably 2 to 5,000.

[Formula 3]

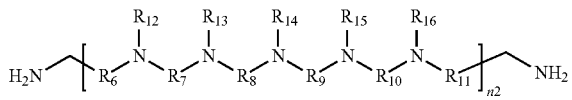

In Formula 3, $R_6$ to $R_{11}$ are a substituted or unsubstituted alkylene group having 1 to 5 carbon atoms, and $R_{12}$ to $R_{16}$ are each independently at least one selected from the group consisting of hydrogen (H), a substituted or unsubstituted alkyl group having 1 to 10 carbon atoms, $-NR_{17}R_{18}$, and $-R_{19}NR_{20}R_{21}$, wherein $R_{19}$ is a substituted or unsubstituted alkylene group having 1 to 5 carbon atoms, and $R_{17}$, $R_{18}$, $R_{20}$, and $R_{21}$ are each independently hydrogen (H) , a substituted or unsubstituted alkyl group having 1 to 5 carbon atoms, and $-R_{22}NH_2$, wherein $R_{22}$ is a substituted or unsubstituted alkylene group having 1 to 5 carbon atoms, and n2 is an integer of 1 to 10,000, preferably 1 to 7,500, and more preferably 1 to 5,000.

In a case in which the oligomer includes both the compound represented by Formula 2 and the compound represented by Formula 3, the compound represented by Formula 2 and the compound represented by Formula 3 may be mixed in a weight ratio of 30:70 to 100:0, for example, 40:60 to 95:5. When the oligomer is used by mixing the compound represented by Formula 2 and the compound represented by Formula 3 in the above ratio, mechanical properties of the polymer formed of the oligomer may be improved to prevent leakage of the gel polymer electrolyte and to improve adhesion to the separator.

Specifically, the compound represented by Formula 3 may include at least one compound selected from the group consisting of compounds represented by Formulae 3-1 to 3-3 below.

[Formula 3-1]

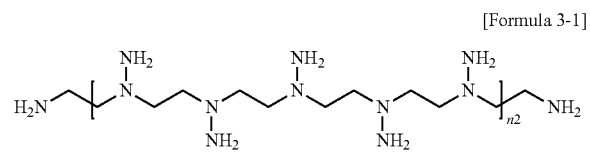

In Formula 3-1, n2 is an integer of 1 to 10,000.

[Formula 3-2]

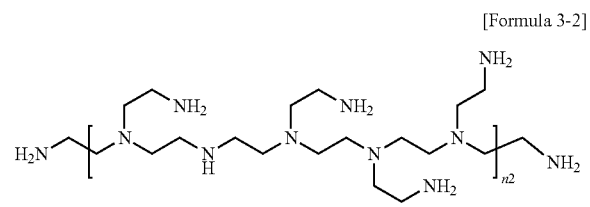

In Formula 3-2, n2 is an integer of 1 to 10,000.

[Formula 3-3]

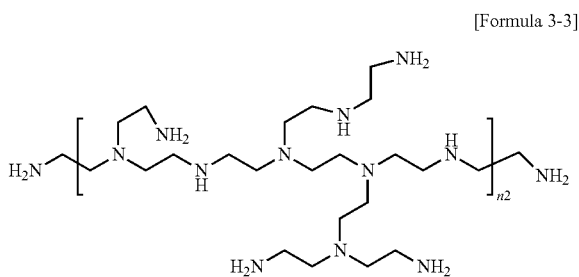

In Formula 3-3, n2 is an integer of 1 to 10,000.

n2 may preferably be an integer of 1 to 10,000, and may more preferably be an integer of 1 to 7,500.

The oligomer represented by Formula 2 or Formula 3 may have a weight-average molecular weight (Mw) of about 100 to about 1,000,000, preferably 100 to 900,000, and more preferably 300 to 800,000. If the oligomer has the above range of the weight-average molecular weight, since the gel polymer electrolyte formed by curing may be stably formed to improve mechanical performance of the battery, heat generation and ignition phenomena, which may be caused by the external impact of the battery, may be suppressed and an explosion phenomenon, which may be caused by the heat and ignition, may also be controlled. Also, since an electrolyte leakage phenomenon and an electrolyte volatilization phenomenon may be suppressed, high-temperature safety of the lithium secondary battery may be significantly improved.

The composition for a gel polymer electrolyte may include a lithium salt and a non-aqueous organic solvent in addition to the oligomer.

Any lithium salt typically used in an electrolyte for a lithium secondary battery may be used as the lithium salt without limitation. For example, the lithium salt may include Li+as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^{31}$ , $CF_3CO_2^-$, $CH_3CO_2^-$, $SCN^-$, and $(CF_3CF_2SO_2)_2N^-$ as an anion. One or, if necessary, a mixture of two or more thereof may be used as the lithium salt. The lithium salt may be included in a concentration of 0.8 M to 2 M, for example, 0.8 M to 1.5 M in the composition for a gel polymer electrolyte. However, the concentration is not necessarily limited to the above range, and the lithium salt may be included at a high concentration of 2M or more depending on other components in the composition for a gel polymer electrolyte.

Any non-aqueous organic solvent typically used in an electrolyte solution for a lithium secondary battery may be used as the non-aqueous organic solvent without limitation. For example, an ether compound, an ester compound, an amide compound, a linear carbonate compound, or a cyclic carbonate compound may be used alone or as a mixture of two or more thereof. Among them, the non-aqueous organic solvent may typically include the cyclic carbonate compound, the linear carbonate compound, or a mixture thereof.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

In particular, cyclic carbonates, such as ethylene carbonate and propylene carbonate, which are known to well dissociate the lithium salt in the electrolyte due to high permittivity as highly viscous organic solvents, among the carbonate-based organic solvents may be used, and an electrolyte solution having high electrical conductivity may be prepared when the cyclic carbonate is mixed with low viscosity, low permittivity linear carbonate, such as dimethyl carbonate and diethyl carbonate, in an appropriate ratio.

Also, as the ether compound among the non-aqueous organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As the ester compound among the non-aqueous organic solvents, any one selected from the group consisting of linear esters such as methyl acetate, ethyl acetate, propyl acetate, methyl propionate, ethyl propionate, propyl propionate, and butyl propionate; and cyclic esters such as γ-butyrolactone, γ-valerolactone, γ-caprolactone, σ-valerolactone, and ε-caprolactone, or a mixture of two or more thereof may be used, but the present invention is not limited thereto.

Next, the positive electrode will be described.

Specifically, the positive electrode may be prepared by coating a positive electrode collector with a positive electrode active material slurry including a positive electrode active material, a binder, a conductive agent, and a solvent.

The positive electrode collector generally has a thickness of 3 μm to 500 μm and is not particularly limited so long as it has conductivity without causing adverse chemical changes in the battery, wherein, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_{Z1}O_4$ (where $0<Z1<2$), etc.), lithium-nickel-cobalt-based oxide (e.g., $LiNi_{1-Y2}Co_{Y2}O_2$ (where $0<Y2<1$), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-manganese-cobalt-based oxide (e.g., $Li(Ni_{p1}Co_{g1}Mn_{r1})O_2$ (where $0<p1<1$, $0<q1<1$, $0<r1<1$, and $p1+q1+r1=1$) or $Li(Ni_{p2}Co_{q2}Mn_{r2})O_4$ (where $0<p2<2$, $0<q2<2$, $0<r2<2$, and $p2+q2+r2=2$), etc.), or lithium-nickel-cobalt-transition metal (M) oxide (e.g., $Li(Ni_{p3}Co_{q3}Mn_{r3}M_{s1})O_2$ (where M is selected from the group consisting of aluminum (Al), iron (Fe), vanadium (V), chromium (Cr), titanium (Ti), tantalum (Ta), magnesium (Mg), and molybdenum (Mo), and p3, q3, r3, and s1 are atomic fractions of each independent elements, wherein $0<p3<1$, $0<q3<1$, $0<r3<1$, $0<s1<1$, and $p3+q3+r3+s1=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$ lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 60 wt % to 98 wt %, preferably 70 wt % to 98 wt %, and more preferably 80 wt % to 98 wt % based on a total weight of solid content excluding the solvent in the positive electrode active material slurry.

The binder is a component that assists in the binding between the active material and the conductive agent and in the binding with the current collector. Specifically, the binder may include polyvinylidene fluoride, polyvinyl alcohol, carboxymethylcellulose (CMC), starch, hydroxypropyl cellulose, regenerated cellulose, polyvinylpyrrolidone, tetrafluoroethylene, polyethylene (PE), polypropylene, an ethylene-propylene-diene terpolymer (EPDM), a sulfonated EPDM, a styrene-butadiene rubber, a fluoro rubber, various copolymers, and the like. The binder may commonly be included in an amount of 1 wt % to 20 wt %, preferably 1 wt % to 15 wt %, and more preferably 1 wt % to 10 wt % based on the total weight of the solid content excluding the solvent in the positive electrode active material slurry.

The conductive agent is a component for further improving the conductivity of the positive electrode active material. Any conductive agent may be used without particular limitation so long as it has suitable conductivity without causing adverse chemical changes in the battery, and, for example, a conductive material, such as: graphite; a carbon-based material such as carbon black, acetylene black, Ketjen black, channel black, furnace black, lamp black, or thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercially available conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon). The conductive agent may be included in an amount of 1 wt % to 20 wt %, preferably 1 wt % to 15 wt %, and more preferably 1 wt % to 10 wt % based on the total weight of the solid content excluding the solvent in the positive electrode active material slurry.

The solvent may include an organic solvent, such as N-methyl-2-pyrrolidone (NMP), and may be used in an amount such that desirable viscosity is obtained when the positive electrode active material as well as selectively the binder and the conductive agent is included. For example, the solvent may be included in an amount such that a concentration of the solid content in the slurry including the positive electrode active material as well as selectively the binder and the conductive agent is in a range of 5 wt % to 70 wt %, preferably 10 wt % to 60 wt %, and more preferably 15 wt % to 50 wt %.

Next, the negative electrode will be described.

The negative electrode, for example, may be prepared by coating a negative electrode collector with a negative electrode active material slurry including a negative electrode active material, a binder, a conductive agent, and a solvent.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include at least one negative electrode active material selected from the group consisting of natural graphite, artificial graphite, a carbonaceous material; lithium-containing titanium composite oxide (LTO); metals (Me) such as silicon (Si), tin (Sn), lithium (Li), zinc (Zn), magnesium (Mg), cadmium (Cd), cerium (Ce), nickel (Ni), or iron (Fe); alloys composed of the metals (Me); oxides ($MeO_x$) of the metals (Me); and composites of the metals (Me) and carbon.

The negative electrode active material may be included in an amount of 60 wt % to 98 wt %, preferably 70 wt % to 98 wt o, and more preferably 80 wt % to 98 wt % based on a total weight of solid content excluding the solvent in the negative electrode active material slurry.

Since the binder, the conductive agent, and the solvent are the same as those described above, detailed descriptions thereof will be omitted.

According to another embodiment of the present invention, a battery module including the lithium secondary battery as a unit cell and a battery pack including the battery module are provided. Since the battery module and the battery pack include the lithium secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

<Method of Preparing Lithium Secondary Battery>

Next, a method of preparing a lithium secondary battery according to the present invention will be described. The method of preparing a lithium secondary battery includes the steps of: (1) inserting an electrode assembly composed of a positive electrode, a negative electrode, and a separator into a battery case, and (2) performing thermal polymerization after injecting a composition for a gel polymer electrolyte including an oligomer into the battery case. Since a functional group of an organic binder and a functional group of the oligomer undergo an epoxy ring-opening reaction in the step of performing thermal polymerization, the organic binder and the oligomer are bonded to each other. Hereinafter, each step will be described.

(1) Step of Inserting Electrode Assembly

First, a positive electrode, a negative electrode, and a separator, which includes a coating layer containing inorganic particles and an organic binder that includes an epoxy group, a functional group capable of undergoing a ring-opening reaction with the epoxy group, or a combination thereof, are prepared. Thereafter, an electrode assembly is prepared by disposing the separator between the positive electrode and the negative electrode. In this case, the prepared electrode assembly is inserted into the battery case. As the battery case, various battery cases used in the art may be used without limitation, and, for example, a cylindrical type, prismatic type, pouch type, or coin type battery case may be used.

Since configurations of the prepared positive electrode, negative electrode, and separator are the same as those described above, detailed descriptions thereof will be omitted.

(2) Step of Performing Thermal Polymerization After Injecting Composition for Gel Polymer Electrolyte Next, after injecting a composition for a gel polymer electrolyte containing an oligomer, which includes the epoxy group, the functional group capable of undergoing a ring-opening reaction with the epoxy group, or the combination thereof, into the battery case into which the electrode assembly is inserted, thermal polymerization is performed by heating.

With respect to a conventional gel polymer electrolyte, a polymerization initiator was used to form the gel polymer electrolyte by curing a composition containing an oligomer. However, with respect to a peroxide-based compound used as a thermal/photopolymerization initiator, since gas was generated as a by-product during the reaction to cause a swelling phenomenon of a battery, there was a limitation in that high-temperature safety of the battery was deteriorated.

However, in a case in which a gel polymer electrolyte is formed by thermal polymerization using an epoxy ring-opening reaction as in the present invention, since the epoxy ring-opening reaction proceeds without the thermal/photopolymerization initiator when heat is applied, the oligomer may be polymerized to form a gel polymer electrolyte. Since the functional group of the organic binder and the functional group of the oligomer may also undergo an epoxy ring-opening reaction during the thermal polymerization of the oligomer, the organic binder and the oligomer may be bonded to each other.

Thus, the composition for a gel polymer electrolyte may be cured without using a polymerization initiator to form a gel polymer electrolyte, and, simultaneously, the organic binder on the coating layer included in the separator may be bonded together to improve the adhesion between the separator and the gel polymer electrolyte.

Mode for Embodiments

Hereinafter, the present invention will be described in more detail, according to specific examples. However, the following examples are merely presented to exemplify the present invention, and the scope of the present invention is not limited thereto. It will be apparent to those skilled in the art that various modifications and alterations are possible within the scope and technical spirit of the present invention, and such modifications and alterations fall within the scope of claims included herein.

EXAMPLES

1. Example 1

(1) Base Material Preparation 100 g of polyethylene and 20 g of polyvinyl alcohol, as a pore-forming agent, were mixed to prepare a mixture. The mixture was dissolved in dimethylformamide, as a polar solvent, in a weight ratio of about 1:10 to form a polymer solution. The polymer solution was cast on a glass plate, put in an oven at about 100° C., and dried for about 30 minutes to obtain a polymer film. Thereafter, polyvinyl alcohol (PVA) was extracted by immersing the polymer film in water to prepare a porous base material.

(2) Coating Layer Composition Preparation 27 g of aluminum oxide ($Al_2O_3$), as inorganic particles, and 3 g of polyvinylidene fluoride (hereinafter, referred to as "PVdF", weight-average molecular weight: 50,000) substituted with 0.5 mol % of an epoxy group, as an organic binder, were put in 72.1 ml of an N-methylpyrrole solution to prepare a coating layer composition.

(3) Preparation of Separator for Secondary Battery

The coating layer composition was coated on the porous base material, and dried for about 30 seconds to prepare a separator for a secondary battery.

2. Example 2

A separator for a secondary battery was prepared in the same manner except that PVdF (weight-average molecular weight: 100,000) substituted with 0.5 mol % of an ethylene imide group was used as an organic binder in Example 1.

COMPARATIVE EXAMPLES

1. Comparative Example 1

In Example 1, a porous base material, on which a coating layer was not formed, was prepared as a separator for a secondary battery.

2. Comparative Example 2

A separator for a secondary battery was prepared in the same manner except that PVdF (weight-average molecular weight: 50,000), which an epoxy group does not substitute, was used as an organic binder in Example 1.

[Preparation Example] Lithium Secondary Battery Preparation 94 wt % of $Li(Ni_{0.8}Mn_{0.1}Co_{0.1})O_2$ as a positive electrode active material, 3 wt % of carbon black as a conductive agent, and 3 wt % of polyvinylidene fluoride (PVdF), as a binder, were added to N-methyl-2-pyrrolidone (NMP), as a solvent, to prepare a positive electrode active material slurry. An about 20 μm thick aluminum (Al) thin film, as a positive electrode collector, was coated with the positive electrode active material slurry and dried, and the coated Al thin film was then roll-pressed to prepare a positive electrode.

96 wt % of carbon powder as a negative electrode active material, 3 wt % of PVdF as a binder, and 1 wt % of carbon black, as a conductive agent, were added to NMP, as a solvent, to prepare a negative electrode active material slurry. A 10 μm thick copper (Cu) thin film, as a negative electrode collector, was coated with the negative electrode active material slurry and dried, and the coated Cu thin film was then roll-pressed to prepare a negative electrode.

A gel polymer electrolyte composition was prepared by adding 5 g of a mixture, in which the compound represented by Formula 2 (weight-average molecular weight (Mw)=500) and the compound represented by Formula 3-3 (weight-average molecular weight (Mw)=10,000) were mixed in a weight ratio of 7:3, to 94.99 g of an organic solvent in which 1 M $LiPF_6$ was dissolved in ethylene carbonate (EC): ethyl methyl carbonate (EMC) (=3:7 (volume ratio)) and stirring to completely dissolve the mixture.

After the positive electrode/separator/negative electrode were sequentially stacked (each of the separators prepared according to Examples 1 and 2 and Comparative Examples 1 and 2 were used as the above separator), the stack was accommodated in a case for a lithium secondary battery, the composition for a gel polymer electrolyte was injected into the case for a lithium secondary battery, and the case was then stored at room temperature for 2 days. Thereafter, the case was heated (thermal polymerization process) at 60° C. for 24 hours to prepare each lithium secondary battery according to Examples 1 and 2 and Comparative Examples 1 and 2.

EXPERIMENTAL EXAMPLES

1. Experimental Example 1

Initial Capacity Measurement Test

After formation was performed on each of the lithium secondary batteries prepared in Examples 1 and 2 and the lithium secondary batteries prepared in Comparative Examples 1 and 2 at a current of 100 mA (0.1 C rate), $3^{rd}$ discharge capacity, which was measured after constant current/constant voltage (CC/CV) charging at 334 mA (0.3 C, 0.05 C cut-off) to 4.2 V and CC discharging at 333 mA (0.3 C) to 3 V were repeated 3 times, was selected as initial capacity. The results thereof are presented in Table 1.

TABLE 1

|  | Initial capacity (mAh) |
|---|---|
| Example 1 | 2.00 |
| Example 2 | 2.01 |
| Comparative Example 1 | 1.95 |
| Comparative Example 2 | 1.97 |

Referring to Table 1, with respect to the lithium secondary batteries of Examples 1 and 2, it may be confirmed that, since the gel polymer electrolyte was stably formed and adhesion to the separator was high, interfacial characteristics were improved, and thus, initial capacities were higher. In contrast, with respect to the lithium secondary batteries of Comparative Examples 1 and 2, it may be confirmed that, since adhesion between the gel polymer electrolyte and the separator was low to increase interfacial resistance, initial capacities of the lithium secondary batteries were measured low.

2. Experimental Example 2

Nail Penetration Test

After metal nails having a diameter of 2.5 mm were dropped at a speed of 600 mm/min to the fully charged lithium secondary batteries prepared in Examples 1 and 2 and Comparative Examples 1 and 2, a thermocouple was attached to a surface of each lithium secondary battery to measure the temperature generated, and whether or not ignition occurred was evaluated. The test results are presented in Table 2.

TABLE 2

|  | Temperature generated (° C.) | The number of cells ignited/the total number of cells tested |
|---|---|---|
| Example 1 | 55 | 0/5 |
| Example 2 | 50 | 0/5 |
| Comparative Example 1 | 110 | 3/5 |
| Comparative Example 2 | 105 | 2/5 |

A short circuit occurred in the lithium secondary battery due to an external impact (impact caused by the metal nail) of the lithium secondary battery and the battery generated heat due to the short circuit, wherein, since the higher the temperature generated was the higher the possibility of ignition was, it was considered that safety was poor. Also, in a case in which the heat generation leaded to ignition, it was evaluated that the safety of the lithium secondary battery was low. According to Table 2, with respect to the lithium secondary batteries of Examples 1 and 2 of the present invention, it may be confirmed that the temperatures generated were all low at 55° C. or less and an ignition phenomenon also did not occur. Alternatively, with respect to the lithium secondary batteries of Comparative Examples 1 and 2, it may be confirmed that the temperatures generated were all 100° C. or higher which were significantly higher than those of the examples and the ignition phenomenon also occurred. This seems to be due to the fact that, with respect to the examples, since the adhesion between the separator and the gel polymer electrolyte was more improved than that of the comparative examples, mechanical durability of the lithium secondary batteries was improved, and thus, an internal short circuit phenomenon due to the external impact was suppressed.

3. Experimental Example 3

High-Temperature Safety Evaluation (Hot Box Test)

After the lithium secondary batteries of Examples 1 and 2 and Comparative Examples 1 and 2 were fully charged at a state of charge (SOC) of 100%, the lithium secondary batteries were left standing for 4 hours at 150° C. to perform tests to confirm whether or not ignition occurred and time at which the ignition started when the ignition occurred. The results thereof are presented in Table 3 below.

TABLE 3

|  | Whether or not ignition occurred | Ignition start time (minutes) |
|---|---|---|
| Example 1 | x | — |
| Example 2 | x | — |
| Comparative Example 1 | o | 30 |
| Comparative Example 2 | o | 120 |

In Table 3, x represents a case where ignition did not occur during storage at 150° C., and 0 represents a case where the ignition occurred during storage at 150° C. According to Table 3, with respect to the lithium secondary batteries of Examples 1 and 2, it may be confirmed that an exothermic reaction was suppressed even during high-temperature storage in a fully charged state and thermal runaway phenomenon and ignition phenomenon also did not occur. In contrast, with respect to the lithium secondary batteries of Comparative Examples 1 and 2, since interface stability was low due to the weak adhesion between the separator and the gel polymer electrolyte, it may be confirmed that the exothermic reaction was not suppressed during storage at 150° C. and the thermal runaway phenomenon and the ignition phenomenon occurred in series.

The invention claimed is:

1. A lithium secondary battery comprising:
a positive electrode;
a negative electrode;
a separator comprising a coating layer that includes an organic binder and inorganic particles; and
a gel polymer electrolyte formed by polymerization of an oligomer,
wherein the organic binder comprises a main chain composed of unit represented by Formula X-1 or Formula X-2 and wherein an epoxy group, a functional group capable of undergoing a ring-opening reaction with an epoxy group, or a combination thereof is substituted into the main chain, and
the organic binder and the gel polymer electrolyte are bonded by an epoxy ring-opening reaction:

Formula X-1 wherein in Formula X-1, m1 is an integer of 1 to 10,000,

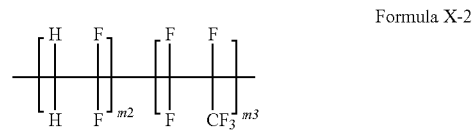

Formula X-2 in Formula X-2, m2 and m3 are each independently an integer of 1 to 10,000 and the oligomer comprises at least one compound selected from the group consisting of compounds represented by Formula 2 and Formula 3:

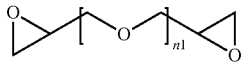

Formula 2 wherein, in Formula 2, n1 is an integer of 2 to 10,000,

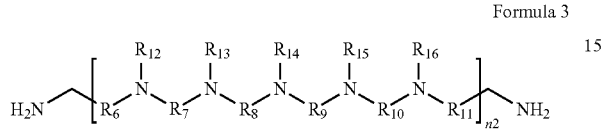

Formula 3 wherein, in Formula 3, $R_6$ to $R_{11}$ are each independently a substituted or unsubstituted alkylene group having 1 to 5 carbon atoms, $R_{12}$ to $R_{16}$ are each independently at least one selected from the group consisting of hydrogen (H), a substituted or unsubstituted alkyl group having 1 to 10 carbon atoms, $-NR_{17}R_{18}$, and $-R_{19}NR_{20}R_{21}$, wherein $R_{19}$ is a substituted or unsubstituted alkylene group having 1 to 5 carbon atoms, and $R_{17}$, $R_{18}$, $R_{20}$, and $R_{21}$ are each independently hydrogen (H), a substituted or unsubstituted alkyl group having 1 to 5 carbon atoms, and $-R_{22}NH_2$, wherein $R_{22}$ is a substituted or unsubstituted alkylene group having 1 to 5 carbon atoms, and n2 is an integer of 1 to 10,000.

2. The lithium secondary battery of claim 1, wherein the oligomer comprises an epoxy group, a functional group capable of undergoing a ring-opening reaction with an epoxy group, or a combination thereof.

3. The lithium secondary battery of claim 1, wherein the functional group capable of undergoing a ring-opening reaction with an epoxy group comprises at least one selected from the group consisting of a hydroxyl group (OH), a carboxylic acid group (COOH), an amine group, an isocyanate group, a mercaptan group, and an imide group.

4. The lithium secondary battery of claim 1, wherein the oligomer comprises at least one unit containing an alkylene oxide group or an amine group, wherein an epoxy group, a functional group capable of undergoing a ring-opening reaction with an epoxy group, or a combination thereof is substituted into a chain composed of the unit.

5. A method of preparing the lithium secondary battery according to claim 1, the method comprising:

inserting into a battery case an electrode assembly comprising a positive electrode, a negative electrode, and a separator, wherein the separator comprises a coating layer that includes inorganic particles and an organic binder that comprises an epoxy group, a functional group capable of undergoing a ring- opening reaction with an epoxy group, or a combination thereof;

injecting into the battery case a composition for a gel polymer electrolyte comprising an oligomer that comprises an epoxy group, a functional group capable of undergoing a ring- opening reaction with an epoxy group of the oligomer, or a combination thereof, and thermally polymerizing the composition for a gel polymer electrolyte, wherein the organic comprises a main chain composed of unit represented by Formula X-1 or Formula X-2 and wherein an epoxy group, a functional group capable of undergoing a ring-opening reaction with an epoxy group, or a combination thereof is substituted into the main chain:

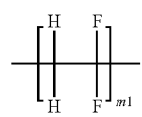

Formula X-1 wherein in Formula X-1, m1 is an integer of 1 to 10,000,

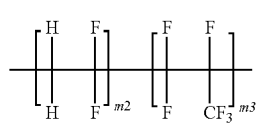

Formula X-2 wherein in Formula X-2, m2 and m3 are each independently an integer of 1 to 10,000 and the oligomer comprises at least one compound selected from the group consisting of compounds represented by Formula 2 and Formula 3:

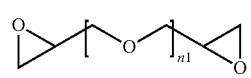

Formula 2 wherein, in Formula 2, n1 is an integer of 2 to 10,000,

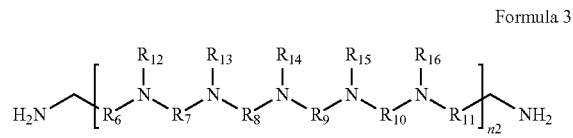

Formula 3 wherein, in Formula 3, $R_6$ to $R_{11}$ are each independently a substituted or unsubstituted alkylene group having 1 to 5 carbon atoms, $R_{12}$ to $R_{16}$ are each independently at least one selected from the group consisting of hydrogen (H), a substituted or unsubstituted alkyl group having 1 to 10 carbon atoms, $-NR_{17}R_{18}$, and $-R_{19}NR_{20}R_{21}$, wherein $R_{19}$ is a substituted or unsubstituted alkylene group having 1 to 5 carbon atoms, and $R_{17}$, $R_{18}$, $R_{20}$, and $R_{21}$ are each independently hydrogen (H), a substituted or unsubstituted alkyl group having 1 to 5 carbon atoms, and $-R_{22}NH_2$, wherein $R_{22}$ is a substituted or unsubstituted alkylene group having 1 to 5 carbon atoms, and n2 is an integer of 1 to 10,000.

6. The method of claim 5, wherein the functional group of the organic binder and the functional group of the oligomer undergo an epoxy ring-opening reaction when the oligomer is thermally polymerized.

7. The method of claim 5, wherein the composition for a gel polymer electrolyte does not comprise an initiator.

8. The method of claim 5, wherein the composition for a gel polymer electrolyte comprises a lithium salt, a non-aqueous organic solvent, and the oligomer.

9. The lithium secondary battery of claim 2, wherein the functional group capable of undergoing a ring-opening reaction with an epoxy group comprises at least one selected from the group consisting of a hydroxyl group (OH), a carboxylic acid group (COOH), an amine group, an isocyanate group, a mercaptan group, and an imide group.

10. The lithium secondary battery of claim 1, wherein the functional group capable of undergoing a ring-opening reaction with an epoxy group comprises a hydroxyl group (OH).

11. The lithium secondary battery of claim 1, wherein the functional group capable of undergoing a ring-opening reaction with an epoxy group comprises a carboxylic acid group (COOH).

12. The lithium secondary battery of claim 1, wherein the functional group capable of undergoing a ring-opening reaction with an epoxy group comprises an amine group.

13. The lithium secondary battery of claim 1, wherein the functional group capable of undergoing a ring-opening reaction with an epoxy group comprises an isocyanate group.

14. The lithium secondary battery of claim 1, wherein the functional group capable of undergoing a ring-opening reaction with an epoxy group comprises a mercaptan group.

15. The lithium secondary battery of claim 1, wherein the functional group capable of undergoing a ring-opening reaction with an epoxy group comprises an imide group.

16. The lithium secondary battery of claim 1, wherein the compound represented by Formula 3 includes at least one compound selected from the group consisting of compounds represented by Formulae 3-1 to 3-3:

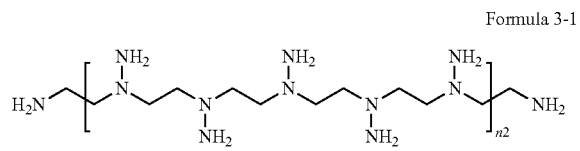

Formula 3-1 wherein, in Formula 3-1, n2 is an integer of 1 to 10,000,

Formula 3-2 wherein, in Formula 3-2, n2 is an integer of 1 to 10,000,

Formula 3-3 wherein, in Formula 3-3, n2 is an integer of 1 to 10,000.

17. The lithium secondary battery of claim 1, wherein when the oligomer includes both the compound represented by Formula 2 and the compound represented by Formula 3, the compound represented by Formula 2 and the compound represented by Formula 3 are mixed in a weight ratio of 30:70 to 100:0.

* * * * *